United States Patent [19]
Henry et al.

[11] Patent Number: 4,998,793
[45] Date of Patent: Mar. 12, 1991

[54] ADIABATIC POLARIZATION MANIPULATING DEVICE

[75] Inventors: Charles H. Henry, Montgomery Township, Somerset County; Rudolf F. Kazarinov, Martinsville; Yosi Shani, Murray Hill, all of N.J.

[73] Assignee: AT&T Bell Laboratories, Murray Hill, N.J.

[21] Appl. No.: 437,049

[22] Filed: Nov. 14, 1989

[51] Int. Cl.$^5$ ................................................ G02B 6/26
[52] U.S. Cl. ............................. 350/96.15; 350/96.16; 350/96.33
[58] Field of Search ................... 350/96.12–96.16, 350/96.20–96.22, 96.30, 96.33

[56] References Cited

U.S. PATENT DOCUMENTS

| | | | |
|---|---|---|---|
| 4,070,094 | 1/1978 | Martin | 350/96.14 |
| 4,262,992 | 4/1981 | Berthold, III | 350/96.14 |
| 4,701,009 | 10/1987 | Tangonan et al. | 350/96.14 X |
| 4,711,514 | 12/1987 | Tangonan et al. | 350/96.34 X |
| 4,763,977 | 8/1988 | Kawasaki et al. | 350/96.15 |
| 4,779,945 | 10/1988 | Hill et al. | 350/96.15 |
| 4,796,968 | 1/1989 | Coccoli et al. | 350/96.15 |

OTHER PUBLICATIONS

"An Optical Waveguide TE–TM Mode Splitter", *Applied Physics Letters*, 32(5), Mar. 1, 1978, M. Kobayashi et al, pp. 300–302.
"A Passive TE/TM Mode Splitting Device by the Ion–Exchanged LiNbO₃ Waveguide", Y. FUJII, pp. 111–112, Feb. 1985.
*The Transactions of the IECE of Japan*, vol. E 68, No. 2.
"An Optical RE—TM Mode Splitter Using a LiNbO$_3$ Branching Waveguide", M. Masuda et al., i Applied Physics Letters, vol. 37(1), Jul. 1, 1980, pp. 20–22.
"Single–Mode Optical Y–Branching Circuit Using Deposited Silica Guides (DS Guides)", Y. Murakami et al, *Electronics Letters*, 11th Jun., 1981, vol. 17, No. 12, pp. 411–413.
"Mode Conversion in Planar-Dielectric Separating Waveguides", W. K. Burns et al, *IEEE Journal of Quantum Electronics*, vol. QE-11, No. 1, Jan., 197, pp. 32–39.
TE-TM Mode Splitter Using Branching Waveguides Made by Proton Exchange and Ti Duffusion, N. Goto et al, IGWO'89.
Topical Meeting on Integrated and Guided Wave Optics, pp. 262–265, Feb. 6–8, 1989, Brown Convention Center, Houston, Tex.
"Dielectric thin-film Optical Branching Waveguide", *Appl. Phys. Ltr.*, vol. 22, No. 12, Jun. 15, 1973, H. Yajima, pp. 647–649.

*Primary Examiner*—Akm Ullah
*Attorney, Agent, or Firm*—M. J. Urbano

[57] ABSTRACT

A TE-TM polarization manipulating (i.e., splitting, combining or filtering) device is constructed from substrate-supported dielectric thin film waveguides. In a 3-port device, two waveguides have cores of different materials and different effective refractive indices. The waveguide cores overlap in a first transition section and one waveguide core has an adiabatic taper; in this section they also separate adiabatically in and are coupled to a second (e.g., output) section where the waveguides are physically separate and optically decoupled. In a 4-port device, two additional waveguides are coupled in a second adiabatic transition section to the first transition section to enable TE or TM modes to be coupled straight through the device from one input port to a directly opposite output port or to be crossed-over from one input port to a diagonally opposite output port.

19 Claims, 8 Drawing Sheets

4,998,793

ADIABATIC POLARIZATION MANIPULATING DEVICE

CROSS-REFERENCE TO RELATED APPLICATIONS

This application is a continuation-in-part of application Ser. No. 07/327,851 (C. H. Henry 13-9-2) filed on Mar. 23, 1989 now abandonment and was concurrently filed with application Ser. No. 07/436,169 now allowed (G. E. Blonder 17-15-13-29), entitled "Hybrid Optical Isolator and Circulator."

Background of the Invention

This invention relates to TE-TM polarization manipulating (i.e., splitting, combining or filtering) devices and, more particularly, to integrated optic versions of such devices constructed from substrate-supported thin film waveguides.

In many important applications, such as coherent lightwave receivers and polarization independent optical isolators and circulators, it is necessary in some designs to separate the transverse electric (TE) mode from the transverse magnetic (TM) mode. In designs using bulk optics the polarization splitting device is typically a birefringent calcite cube, but such bulk devices have problems of mechanical and thermal stability. In addition, they are generally inappropriate for integrated optics where more sophisticated designs have been implemented in order to achieve small size and compatibility with integrated optics components (e.g., semiconductor lasers and photodiodes).

One integrated optics polarization splitter has been proposed by M. Masuda et al in an article entitled "An Optical TE-TM Mode Splitter Using a LiNbO$_3$ Branching Waveguide", *Applied Physics Letters*, Vol. 37, No. 1, p. 20 (1980). This device included LiNbO$_3$ linear, multimode waveguide segments formed in the shape of a Y. To excite the fundamental mode, a prism coupler was required. The core of the entire waveguide was made of Ti-diffused LiNbO$_3$, but half (viewed axially) of the main waveguide and one of the branches were clad with a dielectric film (Al$_2$O$_3$) having a metal electrode thereon; the other half of the main waveguide and the other branch were free of such cladding. Because of the partial cladding with the dielectric film, the clad half waveguide had a refractive index larger than that of the unclad half. In the absence of an applied voltage to the electrode, both TE and TM modes were confined in the clad half of the main waveguide. When a large enough voltage was applied (e.g., 20 V) to overcome the refractive index difference between the halves of the main guide for the ZZ mode, then confinement of the ZZ mode took place in the unclad half of the main guide. But, the TM mode was still confined to the clad half because it was less sensitive to the voltage than the TE mode. Thus, TE-TM mode splitting was possible upon the application of an appropriate voltage. For example, the TE mode propagated into the unclad branch of the Y, whereas the TM mode propagated in the clad branch of the Y. However, the extinction ratio was relatively low (<10 dB).

This type of mode splitting device is disadvantageous and leaves many problems unresolved: (1) it is an active device requiring the application of relatively large voltage with the attendant need for a power supply and its associated cost; (2) it is fabricated in LiNbO$_3$ rather than semiconductors and dielectrics preferred for integrated optics such as silicon compounds or Group III-V compounds; (3) it utilizes a separate prism coupler to excite the fundamental mode; (4) the Y-branch has a large branching angle of 2.86°; it is therefore not adiabatic; that is, it excites modes in the output branches other than the fundamental mode; and (5) it is incompatible with single mode waveguide technology.

On the other hand, H. Yajima describes a thin-film optical branching glass waveguide in *Applied Physics Letters*, Vol. 22., No. 12, pp. 647–649 (1973) which addresses the effect of the large angle between branching waveguides. A trilayered structure of glass —SiO$_2$— glass was sputtered onto a substrate so that the edge of the SiO$_2$ layer was tapered to a slope of 1:500. From this shallow taper one can infer that mode transitions between the main glass waveguide (ARM NO. 1) and the branching glass waveguides (ARM NO. 2 NO. 3) are adiabatic. Both mode filtering and mode conversion were observed for TE modes, but mode splitting, combining or filtering between TE and TM modes was neither observed nor suggested.

Thus, there remains a need for an integrated polarization splitter, and the corollary polarization combiner and filter, which alleviates the remaining problems of the prior art.

SUMMARY OF THE INVENTION

In accordance with one aspect of the invention, a polarization manipulating device is fabricated from at least two substrate-supported, thin film waveguides having cores of different materials and different refractive indices. A 3-port version of the device has a first section which includes a first waveguide core, a second section having at least one pair of branches where the cores are physically separate and optically decoupled from one another, and a transition section where the cores overlap and then gradually separate from one another so as to adiabatically couple the first section to the second section. The refractive indices of the core materials are designed so that, when considering the waveguide modes of the "system" (i.e., of the combination of waveguides viewed as a whole) one branch of the second section has the highest effective refractive index for the TE mode and the other branch has the highest effective refractive index for the TM mode.

The term adiabatic implies that once a relatively high refractive index system mode is excited, energy stays in that mode and does not convert to a lower index system mode (and conversely), although the waveguide and/or mode may change shape and/or refractive index in undergoing the adiabatic transition. This principle, and the relationship between waveguide modes and system modes, will be explained more fully hereinafter.

In a polarization splitter embodiment of the invention, the first section is an input section and the branches of the second section are output branches. On the other hand, in a polarization combining or filtering device, the first section is an output section and the branches of the second section are input branches. When functioning as a combiner, the TE and TM modes combine in the transition section and propagate out of the output section, but as a filter any mode (TE or TM) applied to an input branch which does not have its highest effective refractive index for that mode, would be radiated out of the device and no significant energy would propagate in the output section, provided that the output section is either (1) designed not to support that mode, or (2) is coupled to a device (e.g., a single mode fiber) which does not support that mode.

In a preferred embodiment, the end of one of the waveguides in the transition section is adiabatically tapered.

In silicon "optical bench" technology, the thin film waveguides advantageously have silica claddings and either doped silica cores or silicon nitride cores, or both.

Yet another embodiment of the invention is a 4-port device which incorporates the above-described 3-port device along with another pair of thin film waveguide branches coupled to the first section. One of these branches has a higher effective refractive index than the other for both TE and TM modes. As a result, TE or TM mode signals are either coupled straight through the device from one input port to a directly opposite output port, or they are coupled via a cross-over path from one input port to a diagonally opposite output port.

BRIEF DESCRIPTION OF THE DRAWING

The invention, together with its various features and advantages, can be readily understood from the following more detailed description taken in conjunction with the accompanying drawing in which, in the interest of simplicity and clarity, the figures have not been drawn to scale.

DETAILED DESCRIPTION

Adiabatic Transitions

Before discussing the invention in detail, it will be helpful to define the term "adiabatic". To do so we will make an analogy between the energy levels of a particle in a box (i.e., in a potential well) and the transverse modes of light propagating in a dielectric waveguide (i.e., in a refractive index well). These two phenomena can be described by similar Schroedinger wave equations where the potential V is replaced by the refractive index $\underline{n}$.

Figure 11:
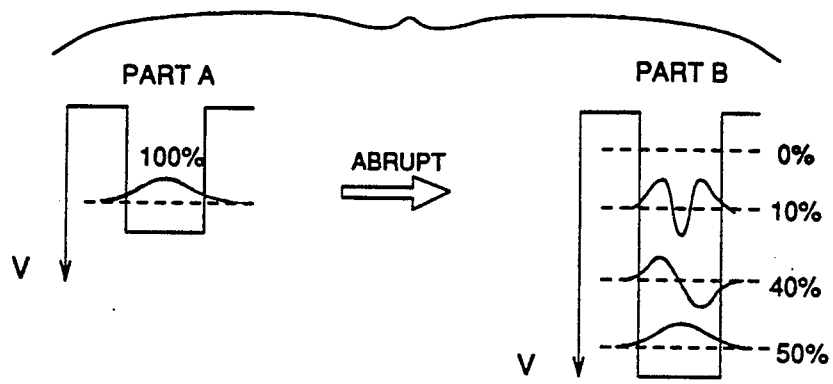
FIGS. 11 and 12 show the quantum mechanical modes associated with the potential of a particle in a box for an abrupt transition in potential V (FIG. 11) and for a gradual (adiabatic) transition (FIG. 12).
Figure 12:
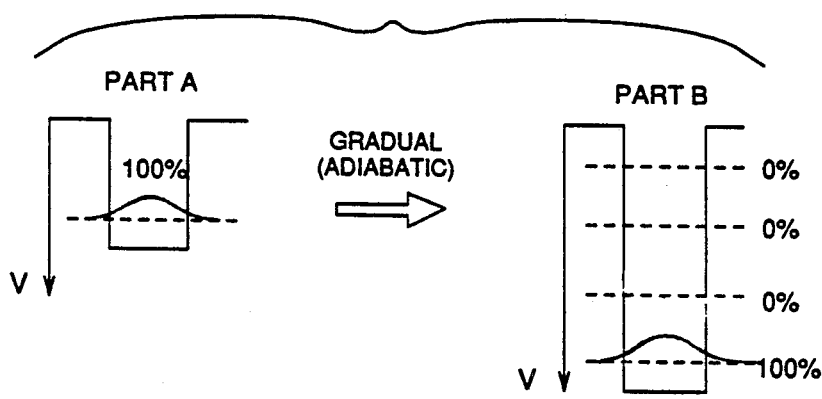

In general, a transition is said to be adiabatic in the quantum mechanical sense if the energy level occupation (mode occupation in the optical case) is conserved in passing through the transition. To be adiabatic the transition needs to be gradual, not abrupt. Consider first a non-adiabatic, abrupt change in potential associated with a particle in a box, as shown in FIG. 11. Initially, all of the energy of the particle resides in a fundamental mode (FIG. 11, Part A), but after the potential (i.e., the bottom of the box) increases abruptly, the energy of the particle is split into more than one mode (illustratively into three modes, FIG. 11, Part B). In contrast, the result of an adiabatic transition of potential for the same particle is depicted in FIG. 12, Part B; ideally all of the energy which started out in a fundamental mode (FIG. 12, Part A) is still all in the fundamental mode after the transition (FIG. 12, Part B). The latter figure also demonstrates that, although the potential well can support more than one mode, energy need not be present in all of them.

Figure 13:
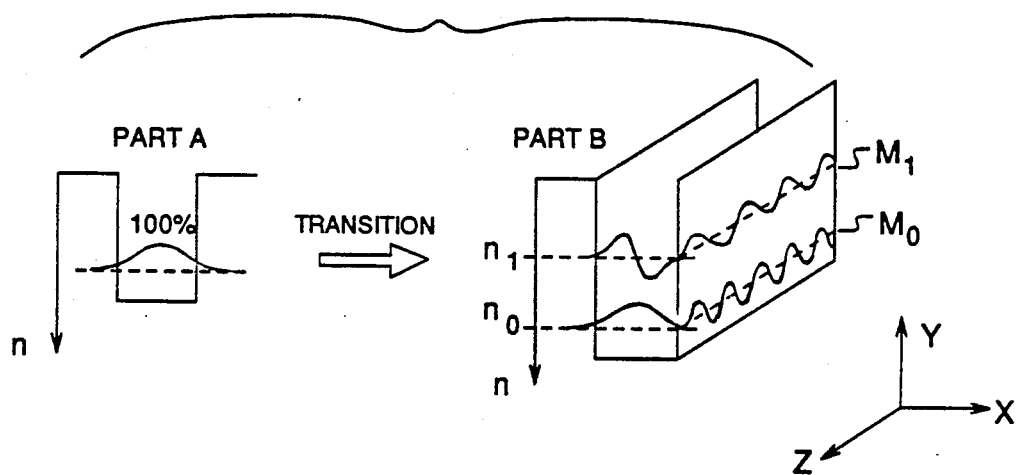
FIG. 13 shows the modes associated with the effective refractive index $\underline{n}$ of light propagating in a dielectric waveguide; it is useful in defining the term "adiabatic" as it applies to gradual transitions of waveguide parameters.

To extend this analogy to the principles of light propagation in dielectric waveguides, we turn our attention to FIG. 13. As before, we assume that initially all of the energy propagating in the z-direction is contained in a fundamental transverse mode (FIG. 13, Part A). However, after undergoing a transition in a waveguide parameter (e.g., width, thickness, refractive index—the latter is depicted in FIG. 13), we ask the question: under what conditions is the transition adiabatic; i.e., under what (ideal) conditions will all of the energy remain in a fundamental mode.

To answer this question, consider two lightwaves $M_0$ and $M_1$ propagating in a dielectric waveguide in the z-direction as shown in FIG. 13, Part B. Propagation of the fundamental mode $M_0$ is represented by $e^{i\beta_0 z}$ and of the first order mode $M_1$ by $e^{i\beta_1 z}$, where the propagation constant $\beta = 2\pi n/\lambda$. Thus, $M_0$ is shown as having a shorter wavelength in the dielectric due to its higher refractive index ($n_0 > n_1$) than $M_1$. These two waves will not couple to one another (i.e., transfer energy to one another) unless there is a sufficiently abrupt perturbation of a waveguide parameter to compensate for their difference in propagation constants $\Delta\beta = \beta_0 - \beta_1$. In an ideal adiabatic transition the perturbation is sufficiently gradual that no such compensation for $\Delta\beta$ occurs and hence no coupling between the modes takes place. What is "sufficiently gradual" is defined in terms of the beat length L between the modes, where L is proportional to $1/\Delta\beta$. To be adiabatic the changes (perturbation) should take place over a distance large compared to L. For example, in a branching waveguide structure at least the initial branching angle, where the waveguides are still optically coupled to one another, should be less than about one degree; or the taper of the width of a waveguide should exhibit similarly small angles. A corollary to this principle is that, if the waveguides are designed to have larger mode splitting (i.e., larger $\Delta\beta$), then the beat length will be shorter and the parameter transitions can be made to be adiabatic over a shorter distance, which means that smaller adiabatic devices suitable for integrated applications are feasible.

3-Port Device

Figure 1:
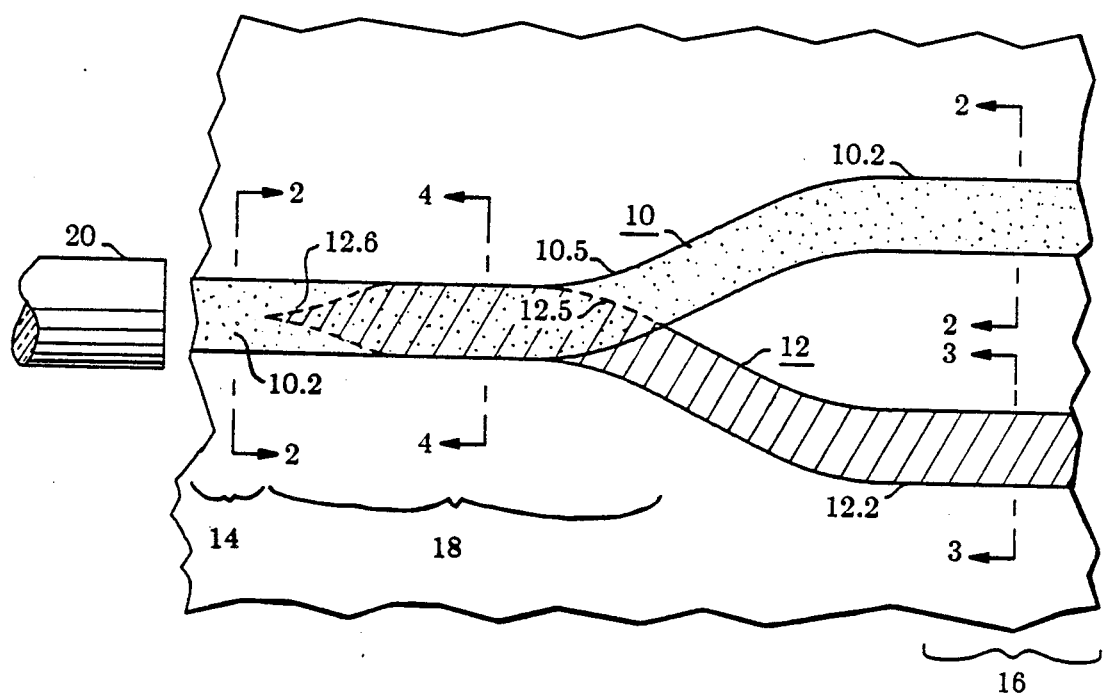
FIG. 1 is a schematic top view of a 3-port polarization splitting, combining or filtering device in accordance with various embodiments of the invention. For clarity of illustration, the top cladding layer is not shown so as to expose the underlying cores.
Figure 2:
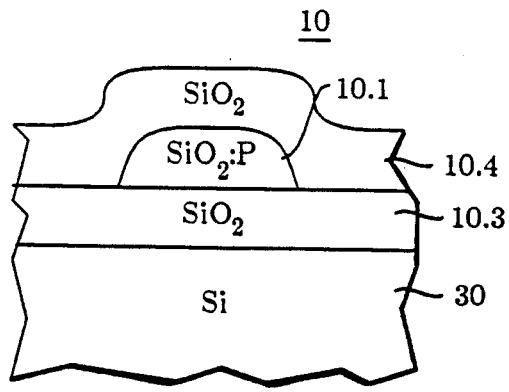
FIG. 2 is a cross section of first (e.g., input) section 14 and branch 10.2 of the second (e.g., output) section of FIG. 1 taken along lines 2—2, but with the cladding 10.4 added for completeness.
Figure 3:
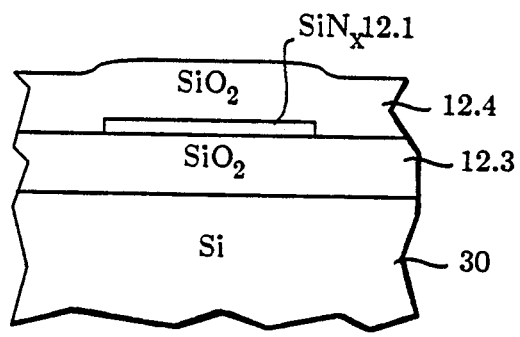
FIG. 3 is a cross section of branch 12.2 of the second (e.g., output) section of FIG. 1 taken along line 3—3, but with the cladding 12.4 added for completeness.
Figure 4:
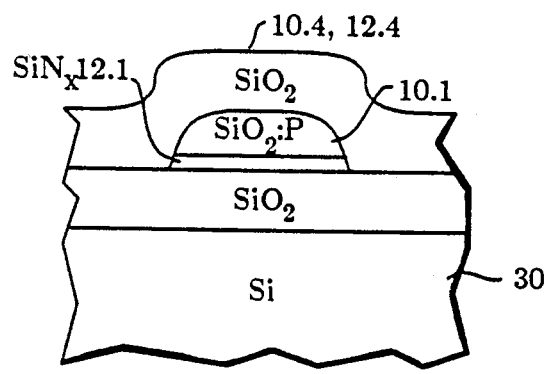
FIG. 4 is a cross section of the transition section 18 of FIG. 1 taken along line 4—4, but with the cladding 10.4, 12.4 added for completeness.

Although the invention relates to passive optical polarization splitting, combining and/or filtering devices, initially we describe for simplicity only a 3-port polarization splitting device in conjunction with FIGS. 1–5. Turning now to FIG. 1, there is shown such a polarization splitting device fabricated from at least two substrate-supported, thin-film waveguides 10 and 12 having cores 10.1 and 12.1, respectively, as shown in FIGS. 2 and 3. The waveguides may be designed to support only a single (i.e., fundamental) mode or to support multiple modes, but in the latter case it may be preferable that some other part of the apparatus/system filter out higher order modes. This filtering function could be performed, for example, by a single mode optical fiber coupled to the multimode waveguide(s).

For purposes of definition, the TE polarization has the transverse electric field parallel to the substrate, whereas TM polarization has the transverse electric field perpendicular to the substrate.

Returning to FIG. 1, the device has a first (i.e., input) section 14 which includes waveguide core 10.2, as shown in FIG. 2, a second (i.e., output) section 16 where the cores are physically separate and optically decoupled, and a transition section 18 where the cores overlap and then gradually separate from one another so as to adiabatically couple the input section 14 to the output section 16.

The refractive indices of the core materials are designed so that, when TE and TM modes are excited in the input section, as by radiation coupled from optical fiber 20, essentially only the TM mode is coupled into output branch 10.2 and essentially only the TE mode is coupled into output branch 12.2. More specifically, this form of TE-TM polarization splitting is achieved provided that the birefringence of the waveguide 12 is greater than and straddles the birefringence, if any, of waveguide 10; that is, $$n_{TM12} < (n_{TM10}, n_{TE10}) < n_{TE12}, \quad (1)$$

where $\underline{n}$ is the effective refractive index, TMi and TEi designate the fundamental transverse magnetic and electric optical modes in the ith (i=10,12) waveguide. Preferably, the refractive indices of the waveguide 10 are about halfway between those of the waveguide 12. This design enhances the efficiency of the adiabatic transition which is dependent on the refractive index difference between the waveguides for a given polarization. The halfway design ensures that the cross-talk, coupling of an unwanted polarization into a particular output waveguide, is suppressed by about the same amount in both output waveguides.

Figure 5:
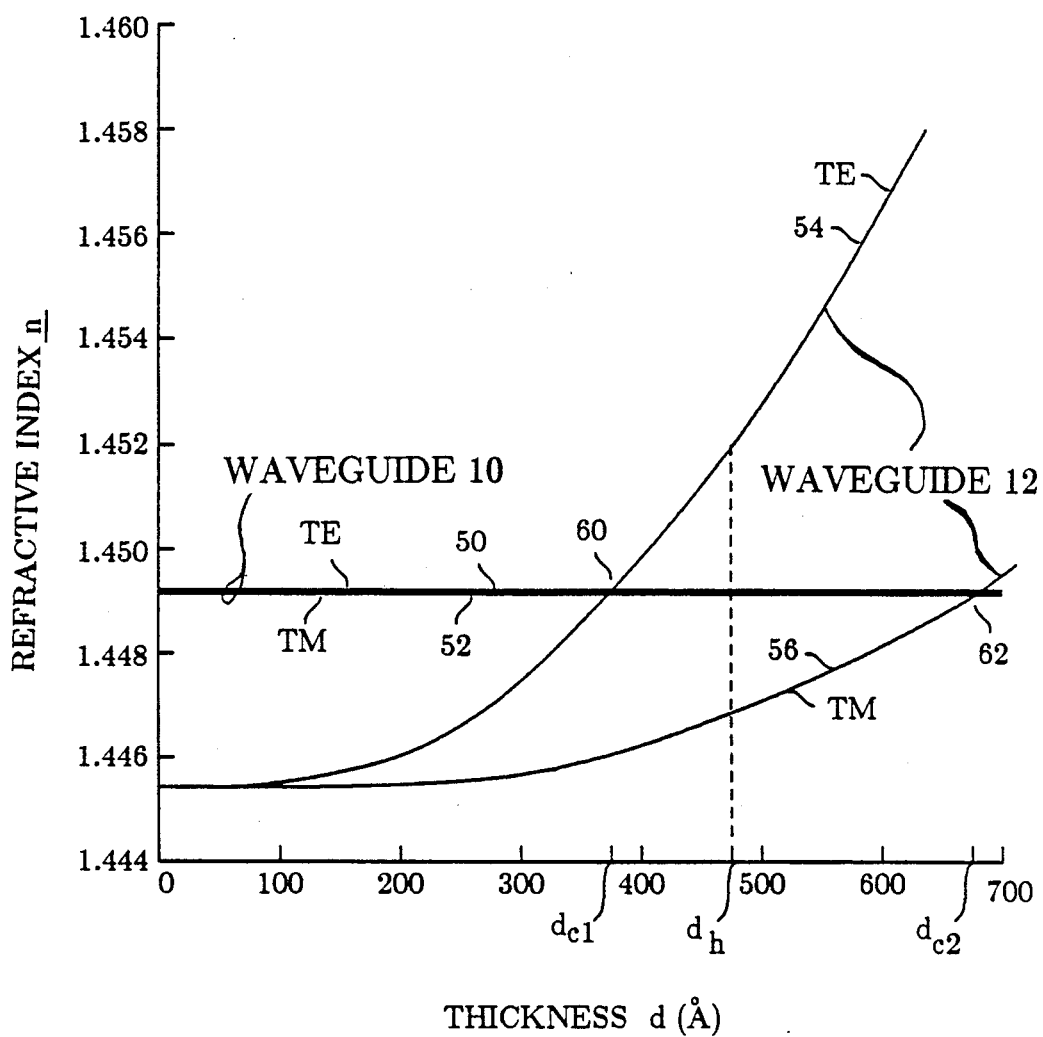
FIG. 5 is a graph of effective refractive index versus core thickness of a birefringent thin film waveguide useful in explaining the operation of one embodiment of the invention.

Although it is not essential, it is advantageous to have thin-film waveguides which are nearly polarization independent to match conventional polarization independent fibers. This characteristic can be achieved by having nearly square cores, or small core-cladding refractive index differences, in the waveguides. Thus, the waveguide 10 is nearly polarization independent, but the waveguide 12 is highly polarization dependent. This situation is depicted in FIG. 5. Lines 50 and 52 represent the refractive indices of the TE and TM modes, respectively, in waveguide 10. That lines 50 and 52 are nearly coincident indicates that waveguide 10 is essentially polarization independent (i.e., it has little, if any, birefringence). Lines 54 and 56, on the other hand, represent the refractive indices of the TE and the TM modes of waveguide 12. That lines 54 and 56 diverge indicates the strong dependence upon thickness of the core.

In order for the birefringence of waveguide 12 to straddle that of waveguide 10, however, the waveguides must be designed so that the device parameters fall between crossover points 60 and 62; that is, for a particular set of materials and dimensions, the waveguide 12 should have a thickness between about $d_{c1}$ and $d_{c2}$. For single mode operation it is desirable that the thickness not be so large that the waveguide 12 supports more than one mode.

Given that the above criterion is satisfied, in a preferred embodiment of FIG. 1 the waveguides in the transition section 18 may adiabatically separate from one another according to any of several mathematical relationships with distance; for example, either a linear or cosine (i.e., essentially quadratic) relationship in zones 10.5 and 12.5 gives satisfactory performance.

In a preferred embodiment, however, the tip 12.6 of the core of waveguide 12 in the transition section 18 is adiabatically tapered to essentially zero in the direction toward the input of the input section 14. As shown in FIG. 1, the tip of the core has a tapered width, but the thickness of the tip of the core 12.1 may be tapered instead of, or in addition to, the width. As discussed above regarding the manner in which the waveguides separate, the tapered dimension of the tip may vary essentially quadratically or linearly with distance along the direction of mode propagation.

Figure 6:
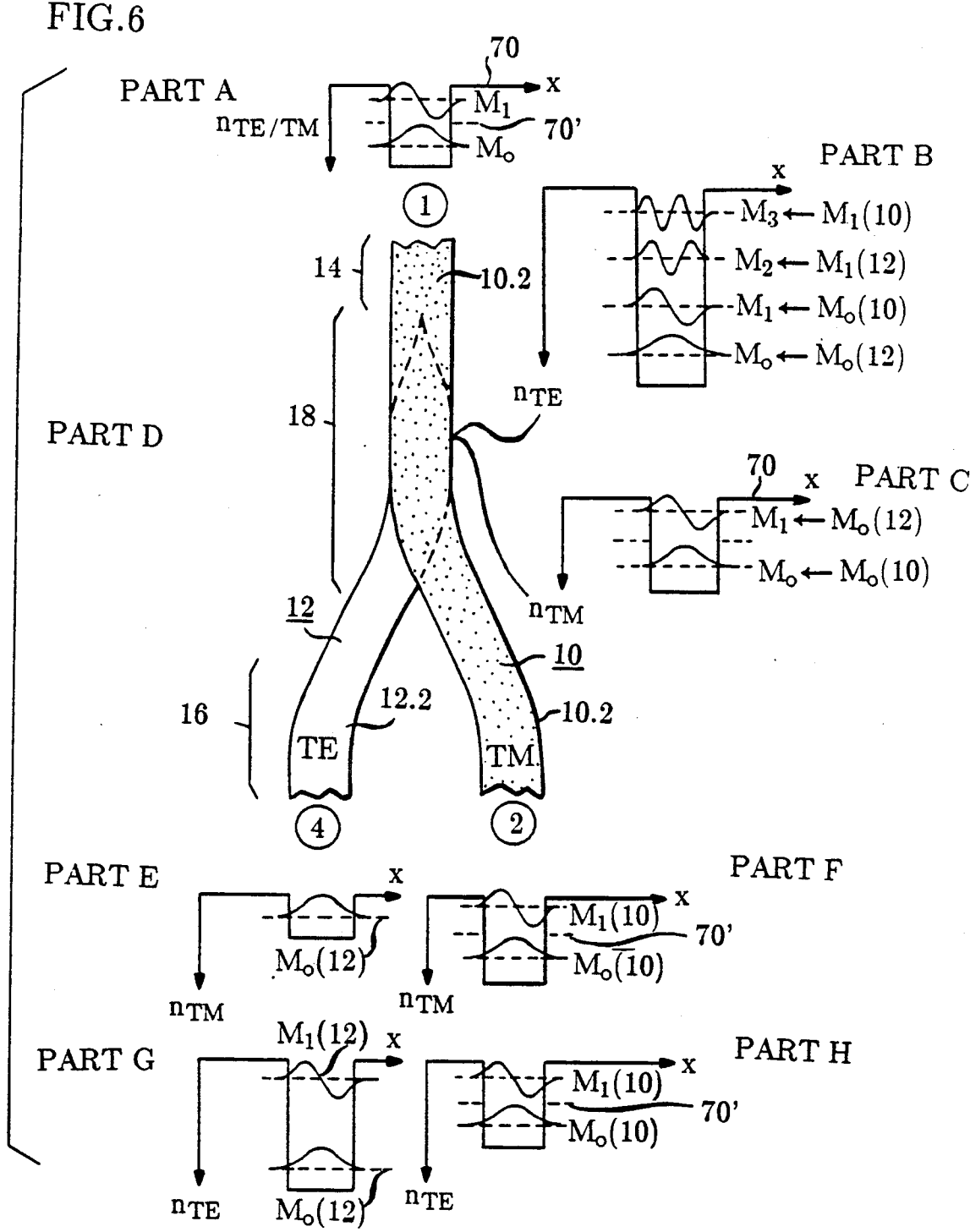
FIG. 6, Part D is a schematic top view of the waveguide cores of FIG. 1, and Parts A-C and E-H show the effective refractive index for the various modes of the device in different parts of the structure.

In operation of a multi-mode embodiment, waveguide 10.2 in the input section 14 supports both the fundamental mode $M_0$ and the first order mode $M_1$, as shown in FIG. 6, Part A for both TE and TM. Both $M_0$ and $M_1$ lie below the top 70 of the potential well defined by the n vs x profile. Even though the waveguide 10.2 is multimode, radiation from a source, such as optical fiber 20, should be coupled and aligned to the waveguide so that only $M_0$ and not $M_1$ is excited in the waveguide. Note, however, the waveguide of input section 14 can be designed to be a single mode waveguide; for example, by making the potential well sufficiently shallow that $M_1$ is above the new top 70' of the well; i.e., in this case $M_1$ would not be a bound mode and, therefore, it would radiate out of the waveguide 10.2.

In the output section 16 where the waveguides are completely separated, the modes for waveguide 12 are shown in FIG. 6, Part E for TM and Part G for TE. Similarly, the modes for waveguide 10 are shown in FIG. 6, Part F for TM and Part H for TE. Note that each waveguide is shown to support more than one mode, except for the TM mode in waveguide 12 where, for illustration purposes only, Part E shows that only the fundamental mode is bound (this waveguide could, however, also be multi-mode for TM). As above, however, if the input section 14 is made from a single mode waveguide, then so is waveguide 10.2 of the output section 16 since the waveguide 10.2 has the same core and cladding in both of these sections. Consequently, FIG. 6, Parts F and H, depicts that only $M_0$ is bound in the output section just as Part A depicts that only this mode is bound in the input section.

A comparison of only the four *fundamental* modes $M_0$ of FIG. 6, Parts E-H, indicates that in the output section 16 waveguide 12, being birefringent, has the highest effective refractive index for TE (Part G) and the lowest for TM (Part E), whereas waveguide 10, being non-birefringent, has effective refractive indices for TM (Part F) and TE (Part H) which are about the same. Moreover, the relative positions of the four modes show that the effective refractive indices of waveguide 12 for the fundamental modes straddle those of waveguide 10, as required by equation (1). Thus, if a lightwave signal of arbitrary polarization and fundamental mode is applied to input section 14, then the TM polarization is coupled to output waveguide 10.2 and the TE polarization is coupled to output waveguide 12.2. Conversely, if the following condition is satisfied by waveguides 10 and 12

$$n_{TE12} < (n_{TE10}, n_{TM10}) < n_{TM12}, \quad (2)$$

then the TM polarization would be coupled to output waveguide 12.2 and the TE polarization would be coupled to output waveguide 10.2.

On the other hand, the device of FIG. 1 serves as a TE/TM polarization combiner by simply reversing the direction of the signals; that is, by applying a signal of TE polarization as an input to waveguide 12.2 in section 16 and a signal of TM polarization as an input to waveguide 10.2 in section 16. Under these circumstances the two signals are combined in transition section 18 and propagate out through section 14.

As noted above, however, the device of FIG. 1 also functions as a polarization filter when a signal of TE polarization is applied as an input to waveguide 10.2 in section 16 or a signal of TM polarization is applied as an input to waveguide 12.2 in section 16, or both. Under these circumstances either of the applied signals will be radiated out of the device (i.e., they will not be propagated through it as bound modes) provided that either (1) waveguide 10.2 in section 14 is designed to support only a single (fundamental) mode, as by choosing the refractive index and dimensions so that the top of the potential well of FIG. 6, Part A is at 70'; or (2) if waveguide 10.2 in section 14 supports multiple modes, then by properly coupling this waveguide to a single mode device (such as a single mode fiber) so that only the fundamental mode enters the device (fiber).

To understand the filtering function it will be helpful to define the concept of overall "system" modes as contrasted with individual waveguide modes. System modes require us to view the device as whole and to rank order the modes according to their effective refractive index. An illustration will be instructive. Consider the device of FIG. 6, Parts G and H where the refractive index $n_{TE}$ of four TE modes is plotted against the dimension x for waveguide 12 (Part G) and waveguide 10 (Part H). The TE waveguide modes can be rank ordered as follows: the mode with the highest refractive is the fundamental mode $M_0(12)$ of waveguide 12; the second highest is the fundamental mode $M_0(10)$ of waveguide 10; the third highest is the first-order mode $M_1(12)$, and the lowest is the first-order mode $M_1(10)$. These TE waveguide modes correspond in order to the fundamental, first order, second order and third order TE system modes, as follows:

| TE Waveguide Mode | TE System Mode |
|---|---|
| $M_0(12)$ | $M_0$ |
| $M_0(10)$ | $M_1$ |
| $M_1(12)$ | $M_2$ |
| $M_1(10)$ | $M_3$ |

This correspondence of waveguide and system modes does not, however, imply equality. That is, a fundamental TE waveguide mode, such as $M_0(10)$, which becomes a higher order TE system mode, such as $M_1$, changes its gaussian shape to dual lobe shape (FIG. 6, Part B) in sections of the device where the waveguides are optically coupled to one another; i.e., in transition section 18 where the waveguides overlap. These transformations are shown in the table above as well as in FIG. 6, Part B which also depicts the TE system mode shapes for $M_0$ to $M_3$.

The three TM waveguide modes of FIG. 6, Parts E and F can be rank ordered in a similar fashion to define corresponding system modes. However, only two TM system modes $M_0$ and $M_1$ are shown in FIG. 6, Part C, to illustrate the fact that the third (and any higher) order mode $M_2$ may be above the top 70 of the potential well and hence is not bound.

A complete understanding of the filtering function also requires an understanding of the nexus between system modes and the adiabatic principle. As described earlier, the latter states that, if the coupling between waveguides is gradual enough, then once a particular *system* mode is excited anywhere in the device, energy stays in that mode and does convert to a different *system* mode, even though the waveguide and/or the mode may change shape. For example, suppose the fundamental TE waveguide mode $M_0(10)$ (FIG. 6, Part H) is excited in waveguide 10.2 of section 16. As indicated in the table above, this waveguide mode $M_0(10)$ corresponds to the first order TE *system* mode $M_1$. When $M_0(10)$ propagates through the adiabatic transition section 18, its gaussian shape (FIG. 6, Part H) converts to the dual lobe shape of the first order TE *system* mode $M_1$ (FIG. 6, Part B). Note, its characteristic as a first order TE *system* mode has not changed. Likewise, it remains at first order system mode when it traverses the adiabatic taper 12.6 and exits section 14 as first order TE mode $M_1$ (FIG. 6, Part A). Note, in the section 14, which is a single waveguide, the waveguide modes are identical to the system modes.

When TE system mode $M_1$ enters section 14, it will be propagated if that mode is supported; i.e., if as shown in FIG. 6 the effective refractive index of $M_1$ is below the top 70 of this potential well. On the other hand if it is not, if the effective refractive index is above the top 70', then $M_1$ will not propagate (i.e., be guided) in the waveguide 10.2 of section 14; rather it will be radiated out of waveguide and no significant amount of energy from $M_1$ will reach port 1. Thus, TE waveguide mode $M_0(10)$ applied as an input to waveguide 10 via port 2 is converted to TE system mode $M_1$, and is effectively filtered. A corresponding filtering action can be made to take place by applying TM waveguide mode $M_0(12)$ as an input to waveguide 12 via port 4.

This aspect of the invention may also be employed in double filtering applications in which, for example, each output branch 10.2 and 12.2 of FIG. 1 would have an overlapping waveguide forming a separate polarization device of the type shown in FIG. 1.

EXAMPLE

An illustrative embodiment of the invention for implementation with silicon optical bench technology starts with a silicon substrate 30 (FIGS. 2-4) upon which a silica (SiO$_2$) layer 10.3, 12.3 is deposited by a well-known oxidation technique (e.g., high pressure steam oxidation) to an exemplary thickness in the range of about 10-15 μm. Subsequently, a silicon nitride layer is deposited by a well-known technique (e.g., low pressure CVD) to an exemplary thickness in the range of about 300-600 Å and is then patterned using standard photolithographic processing to form the thin film cores 12.1 (FIGS. 3, 4) of silicon nitride waveguides in desired regions. An exemplary width of the core is in the range of about 4-8 μm. Next, doped silica is deposited by a likewise well-known technique (e.g., low pressure CVD) to an exemplary thickness in the range of about 2-6 μm and is then patterned, as above, to form the thin film cores 10.1 (FIGS. 2, 4) of the silica waveguides in desired regions. The thickness of the silica core 10.1 and the refractive index of the core 10.1 relative to that of the cladding 10.3 are preferably mutually adapted to insure that the silica waveguides are essentially polarization independent. To this end, the silica core 10.1 is typically doped with phosphorus to an exemplary level in the range of about 4-8 wt % P; this core material is sometimes referred to as phosphosilicate glass or P-glass. Finally, an upper cladding layer 10.4, 12.4 of silica is deposited to a thickness in the exemplary range of about 3-20 μm using, illustratively, the same technique as that is used for the silica core 10.1. However, the cladding has a phosphorus content in an exemplary range of about 0-2 wt % P and hence has a lower refractive index. Typically, the upper cladding layer 10.4, 12.4 and the silica layer 10.3, which also functions as a (lower) cladding, have about the same refractive index.

Consider the following set of parameters: a P-glass core 10.1 which is 6 μm wide, 4 μm thick, and has 6.5 wt % P; a silicon nitride core 12.1 which is 6 μm wide by 500 Å thick; an upper silica cladding 10.4, 12.4 which is 5 μm thick and has 0 wt % P; and a lower silica cladding 10.3, 12.3 which is 15 μm thick. Using the well-known effective refractive index method and λ=1.55 μm, we calculate for the P-glass core $$n_{TM} = 1.4492 \text{ and } n_{TE} = 1.4492 \quad (3)$$

and for the silicon nitride core $$n_{TM} = 1.4468 \text{ and } n_{TE} = 1.4534 \quad (4)$$

for the fundamental mode in each case. Thus, the refractive indices of the silicon nitride core straddle those of the P-glass core as shown in FIG. 5 and as defined by equation (1). By suitable choice of the thickness (e.g., $d_h$) of the silicon nitride core, the refractive indices of the P-glass core can be made to fall about halfway between those of the silicon nitride core, which is preferred for the reasons noted above. Note also that although a small strain-induced birefringence of the order of 0.0005 has been neglected in the above calculations, the principles remain unchanged.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, in a balanced, polarization independent coherent lightwave receiver, two polarization splitters may be used; after the signal and local oscillator sources are mixed in a 3 dB coupler, the splitters are used to send the mixed signals to different optical detectors for the TE and TM modes. Moreover, while emphasis was placed upon implementation of the invention in silicon optical bench technology, it is readily apparent that Group III-V compound technology can be employed as well. Finally, the 3-port device described above may be incorporated in a 4-port device of the type described below.

4-Port Device

Figure 7:
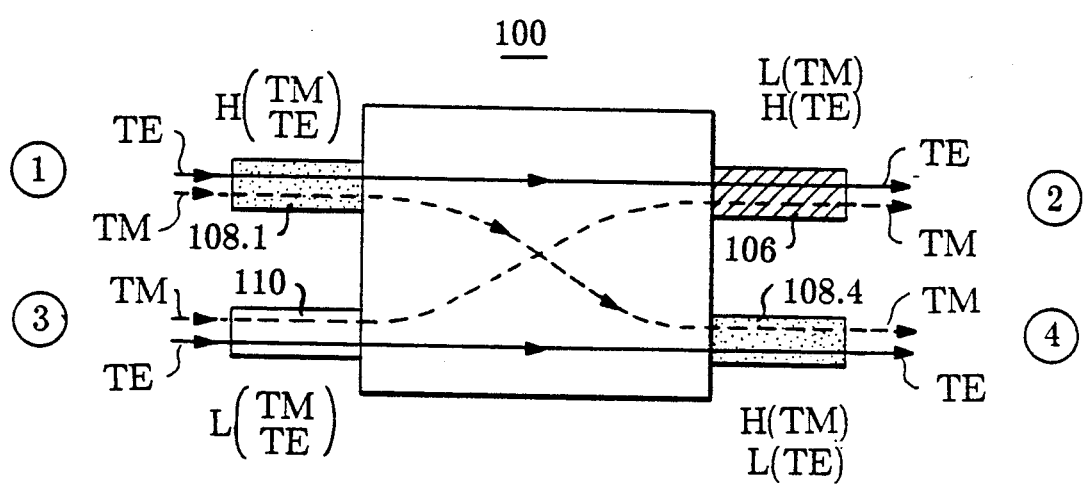
FIG. 7 is a block-diagrammatic view of a 4-port polarization splitting, combining or filtering device in accordance with another embodiment of the invention.
Figure 8:
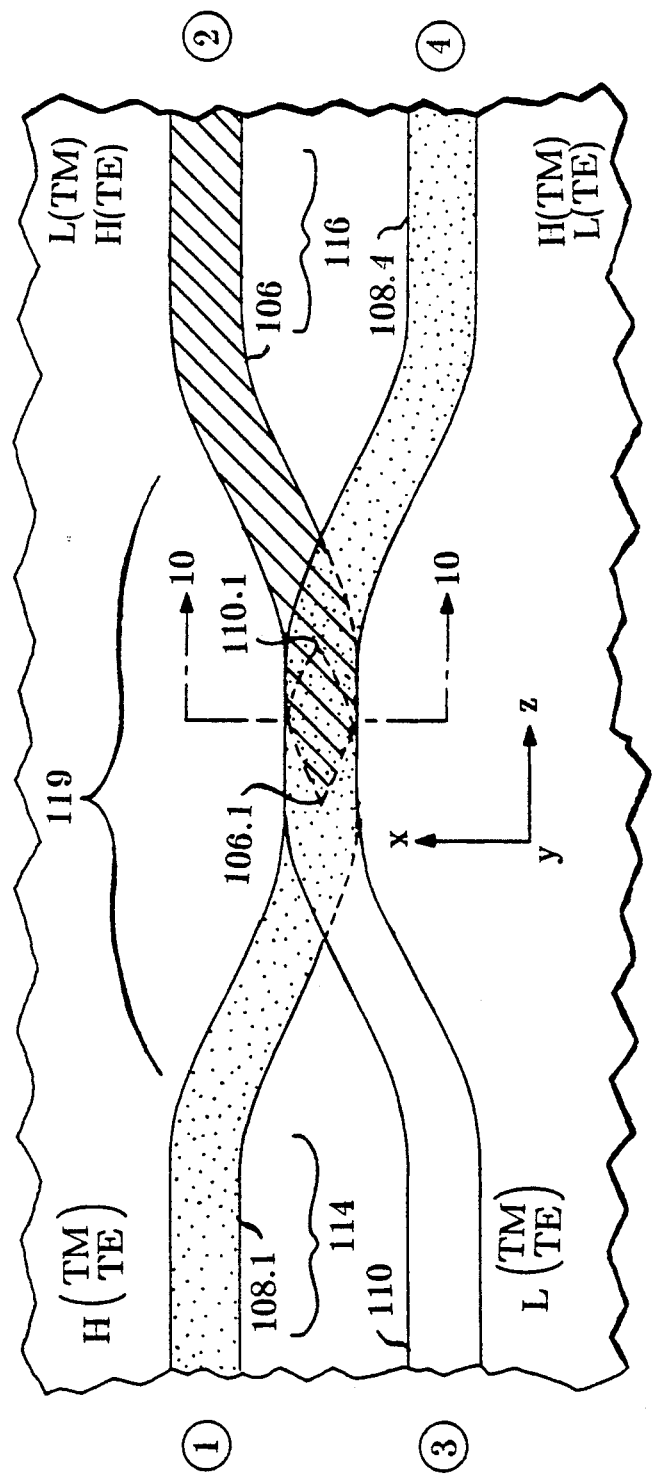
FIG. 8 is a schematic top view of one embodiment of the device of FIG. 7 in which, for clarity of illustration, the top cladding is not shown so as to expose the underlying cores.
Figure 9:
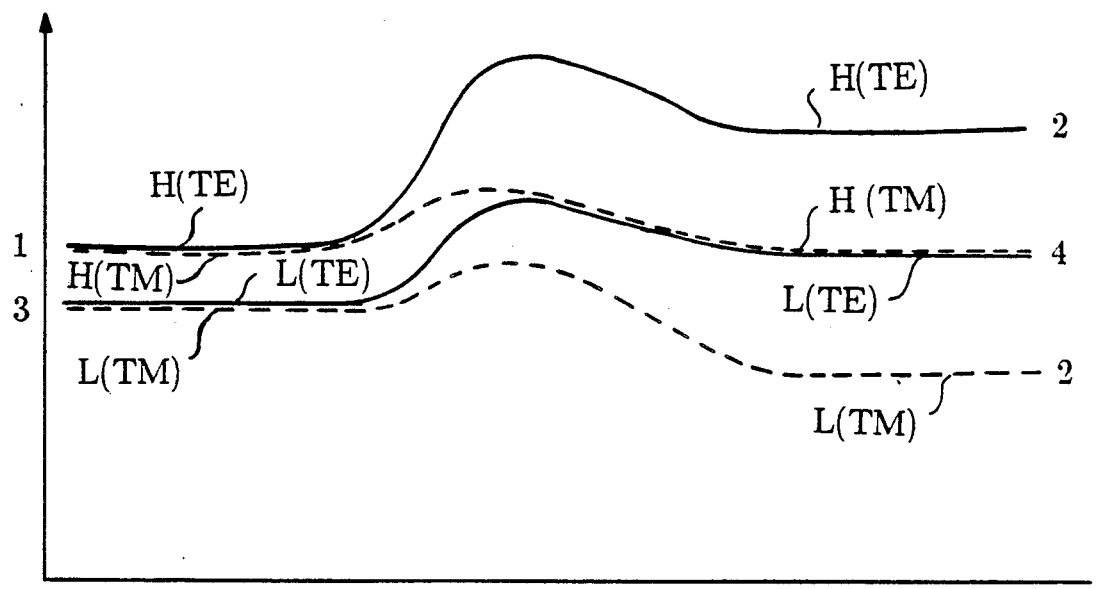
FIG. 9 is a graph showing how mode effective refractive index $\underline{n}$ varies along the propagation direction (z) in the device of FIG. 8.
Figure 10:
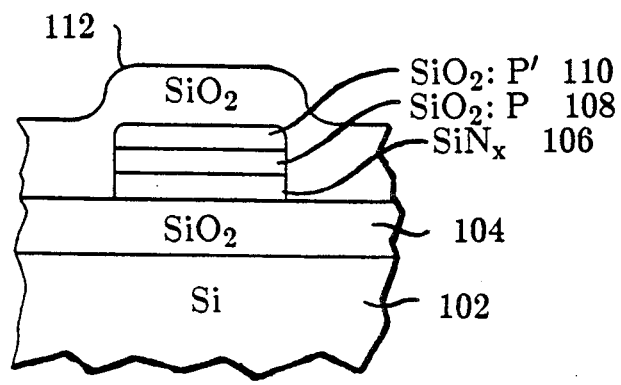
FIG. 10 is a cross-section of the transition section 118 of FIG. 8 taken along line 10—10, but with the cladding 112 added for completeness.

Turning now to FIGS. 7-10, there is shown a 4-port polarization splitting or combining device 100 which is particularly useful in optical circulators of the type described in the aforementioned application of G. E. Blonder et al. The 4-port device 100 comprises input-/output ports 1 and 3 to which waveguides 108.1 and 110 are coupled, and input/output ports 2 and 4 to which waveguides 106 and 108.4 are coupled. Waveguides 106, 108.1 and 108.4 form a 3-port device of the type described earlier with reference to FIGS. 1-6, except for a few differences: (1) ports 2 and 4 have been interchanged (i.e., waveguide 106 has its highest effective refractive index for the fundamental TE mode whereas waveguide 108.4 has its highest index for the fundamental TM mode); (2) the waveguides in the input/output sections 114/116 either support only a single (fundamental) mode or if they support multiple modes, the higher order modes are removed by stripping or by coupling only the fundamental mode to a signal mode device (e.g., fiber) at the output ports; and (3) waveguides 108.1 and 110 are coupled to ports 1 and 3, respectively, and are adiabatically coupled to central section 119. Waveguide 110 has an effective refractive index which is lower than that of waveguide 108.1 for both the TE and TM modes. In contrast, the effective refractive index of waveguide 106 straddles that of waveguide 108.4, as in the 3-port device. These refractive index relationships are depicted in FIG. 9 where the flat sections of the curves correspond to the isolated waveguides and humped sections correspond to the overlapping waveguides. To satisfy the adiabatic principle it is necessary that the pair of solid line curves do not intersect one another over the length of the device. Likewise for the pair of dotted line curves.

As in FIG. 1, waveguide 106 of FIG. 8 is shown to terminate in an adiabatic taper 106.1 in central region 119. Likewise waveguide 110 is shown to terminate in adiabatic taper 110.1. The tapers are preferred whenever adjacent waveguide cores are made of different materials (e.g., P-glass and SiN$_x$).

The higher (H) and lower (L) refractive index nomenclature of FIGS. 7-8 is defined as follows: (1) any waveguide labeled H excites a fundamental system mode in the central region, whereas any waveguide labeled L excites a first order system mode; (2) waveguide 108.1 labeled H (TM/TE) has higher effective refractive indices for both TM and TE than the corresponding modes in waveguide 110 labeled L(TM/TE); see the left side of FIG. 8; (3) waveguide 106 labeled L(TM) and H(TE) has a lower effective refractive index for the TM mode than waveguide 108.4 labeled H(TM) but a higher effective refractive index for the TE mode than waveguide 108.4 also labeled L(TE); see the right side of FIG. 8. Note that H(TM) and H(TE) may be nearly equal as shown.

This nomenclature is useful in understanding how lightwave signals are routed through the 4-port device. The basic algorithm is as follows: when a signal having a particular polarization (e.g., TE) enters a port labeled H, it will exit from an opposite port also labeled H and supporting the same polarization (i.e., a waveguide designated H(TE)). Conversely, when a signal having a particular polarization enters a port labeled L, it will exit from an opposite port also labeled L and supporting the same polarization. Thus, when a TE signal enters port 4, it is on waveguide 108.4 which is labeled L(TE). This signal will exit from directly opposite port 3 because waveguide 110 is labeled L(TM/TE) which includes L(TE) as well as L(TM). Similarly, when a TM mode enters port 4 on waveguide 108.4 labeled H(TM), it propagates through waveguide 108.1 labeled H(TM/TE) and exits from diagonally opposite port 1.

Conversely, if a signal having a TE mode enters port 1, it exits from directly opposite port 2, but a TM mode entering port 1 crosses over and exits from diagonally opposite port 4. Likewise, when a TE mode enters port 3, it exits from directly opposite port 4, but a TM mode entering port 3 crosses over and exits from diagonally opposite port 2. Which mode is made to cross over, as the TM did in the above example, depends on the design and layout of the waveguides. Merely interchanging waveguide 106 with 108.4 would cause the TE mode to cross over and the TM to pass straight through.

The structure of the waveguides of FIG. 7 is illustrated in the cross-sectional view of FIG. 9 where the cladding layer 112 (omitted in FIG. 7 for clarity) has been added. On silicon substrate 102 a lower silica cladding layer 104 is formed and then the stack of three cores 106 ($SiN_x$ having the highest refractive index of the three), 108 (P-glass having an intermediate refractive index corresponding to waveguides 108.1 and 108.4), and 110 (lower doped P-glass having the lowest refractive index). During fabrication, note that waveguides 110 and 108 may start with the same core, but the phosphorus concentration (and hence the refractive index) of waveguide 110 may be selectively altered by covering waveguide 108 so that during annealing more phosphorus is driven out of the core of 110 than the core of 108. Another possibility is to make waveguide 110 with a relatively thin core of P-glass and to make waveguides 108.1 and 108.4 with a thicker core of P-glass, so that only one P-glass refractive index would be used.

We claim:

1. A device for manipulating the polarization of lightwave signals comprising
a substrate,
first and second thin film waveguides supported by said substrate,
said first waveguide having a first core and a cladding surrounding said core and said second waveguide having a second core an a cladding surrounding said second core, characterized in that:
said waveguides have a first section which includes said first core,
said waveguides have a second section wherein said waveguides are optically decoupled and separate from one another,
said waveguides have a first transition section wherein said first and second cores overlap and then gradually separate so as to adiabatically couple said first section and second sections to one another, said first transition section being capable of supporting more than one transverse mode, and
said first and second cores comprise different materials having different effective refractive indices, the refractive indices and dimensions of the cores being mutually adapted so that (1) when radiation is coupled into said first section, the TM mode is coupled to the first waveguide in the second section and the TE mode is coupled to the second waveguide in the second section, or (2) when a TM mode is coupled into said first waveguide and/or a TE mode is coupled into said second waveguide, said mode(s) combine in said transition section and propagate into said first section, or (3) when a TM mode is coupled into said second waveguide and/or a TE mode is coupled into said first waveguide, said mode(s) radiate out of said transition section so that no significant amount of energy from said modes propagates into said first section.

2. The device of claim 1 wherein said first section includes only said first waveguide.

3. The device of claim 2 wherein said first waveguide supports only the fundamental modes for TE and TM polarizations.

4. The device of claim 1 wherein
said refractive indices and the dimensions of said cores are mutually adapted so that $n_{TM2} < (n_{TM1}, n_{TE1}) < n_{TE2}$, where n is the effective refractive index, and TMi and TEi designate the fundamental transverse magnetic and electric waveguide modes in the ith (i = 1,2) waveguide.

5. The device of claim 1 wherein the refractive indices of the first waveguide are about halfway between those of the second waveguide.

6. The device of claim 1 wherein said transition section includes a first zone where said waveguides begin to gradually separate from one another, the separation in said first zone following an essentially quadratic or linear relationship with distance along the direction of mode propagation.

7. The device of claim 1 wherein said second core in said transition section has a tip which is adiabatically tapered to essentially zero.

8. The device of claim 7 wherein a dimension of the tip follows an essentially quadratic or linear relationship with distance along the direction of mode propagation.

9. The device of claim 7 wherein the width of said second core is tapered.

10. The device of claim 7 wherein the thickness of said second core is tapered.

11. The device of any one of claims 1–10 wherein said first core comprises a first silicon compound and said second core comprises a second silicon compound.

12. The device of claim 11 wherein said cladding comprises silica.

13. The device of claim 12 wherein said first compound comprises doped silica and said second compound comprises silicon nitride.

14. The device of claim 13 wherein said cores are about 4–8 μm wide, said silica first core is about 2–6 μm thick, and said silicon nitride second core is about 300–600 Å thick.

15. The device of any one of claims 1–10 wherein said waveguides comprise Group III-V semiconductor compounds.

16. The device of claim 1 further including
third and fourth thin film waveguides supported by said substrate,
said third waveguide having a third core and a cladding surrounding said third core,
said fourth waveguide having a fourth core and a cladding surrounding said fourth core,
said third and fourth waveguides being coupled to said first section wherein said third and fourth cores overlap,
said third and fourth waveguides having a third section wherein said third and fourth waveguides are optically decoupled and separate from one another,
said first section including a second transition section which, together with said first transition section, adiabatically couples said third section and said first section to one another and which is capable of supporting more than one transverse mode, and
the effective refractive indices and dimensions of said cores being mutually adapted so that (1) the refractive index for the fundamental TM waveguide mode is greater in one of said first and second waveguides than the other, and the refractive index for the fundamental TE waveguide mode is conversely less in the one waveguide than in the other, and (2) the refractive index for both the fundamental TM and TE waveguide modes is greater in one of said third and fourth waveguides than in the other.

17. The device of claim 16 wherein said third core is an extension of said first core.

18. The device of claim 16 wherein said fourth core comprises a material having a refractive index different from said first and second cores.

19. The device of claims 1 or 16 wherein in said first or second transition sections said waveguides gradually separate from one another so as to form an angle therebetween, and in at least an initial region where said waveguides are still optically coupled, said angle is less than about one degree.

* * * * *